United States Patent [19]

Wolbarsht

[11] 4,201,456
[45] May 6, 1980

[54] METHOD AND APPARATUS FOR DETECTING THE FOCUSING CONDITION OF AN OPTICAL SYSTEM

[76] Inventor: Mryon L. Wolbarsht, 1435 Acadia St., Durham, N.C. 27701

[21] Appl. No.: 679,318

[22] Filed: Apr. 22, 1976

[51] Int. Cl.$^2$ ............................................. G03B 3/10
[52] U.S. Cl. .................................... 353/101; 354/25
[58] Field of Search .......................... 353/69, 101, 97; 354/25; 352/140; 250/201, 204; 356/123, 125, 126; 350/46

[56] References Cited

U.S. PATENT DOCUMENTS

| | | | |
|---|---|---|---|
| 2,156,433 | 5/1939 | Mendelsohn | 354/195 |
| 2,241,185 | 5/1941 | Cohen | 354/154 |
| 2,999,436 | 9/1961 | Faulhaber | 250/201 |
| 3,549,889 | 12/1970 | Akiyama | 250/201 |
| 3,732,001 | 5/1973 | Harrison | 353/101 |
| 3,746,432 | 7/1973 | Mason | 250/201 X |
| 3,833,806 | 9/1974 | Sato | 356/125 |
| 3,906,219 | 9/1975 | Stauffer | 354/25 |
| 3,915,564 | 10/1975 | Urban | 354/62 X |
| 3,938,893 | 2/1976 | Nanba et al. | 354/25 |

FOREIGN PATENT DOCUMENTS

37957 8/1971 Japan ....................................... 354/195

OTHER PUBLICATIONS

The British Journal of Photography, "Sharp Focus in Enlarging & Copying," p. 556, 9/12/24, by B. Schleicher.

Primary Examiner—Harry N. Haroian
Attorney, Agent, or Firm—Kenyon & Kenyon

[57] ABSTRACT

A method and apparatus for detecting the focusing condition of an optical system is disclosed. Different portions of the optical system are alternatively obstructed to form first and second or more images, respectively, of an object. When the optical system is in focus, the aforesaid first and second images coincide and present a single image. When the optical system is out of focus, the first and second images are displaced with respect to one another. Alternately obstructing different portions of the optical system gives the appearance of a moving image when the first and second images are displaced in response to the optical system being out of focus. Alternately obstructing different portions of the optical system gives the appearance of a stationary image when the first and second images coincide in response to the optical system being in focus. Thus the presence of either a stationary or moving image is an indication of the focus condition of the optical system. A method and apparatus are also disclosed for adjusting an optical system into focus in response to the direction of the displacement of the first and second images when the optical system is out of focus. Thus the direction of adjustment of the optical system to restore focus is in response to the relative movement of the first and second images with respect to one another when the focus of the optical system is varied. The disclosed method and apparatus are applicable to the control of focus in photographic cameras, projection systems, range finders, and the like.

42 Claims, 20 Drawing Figures

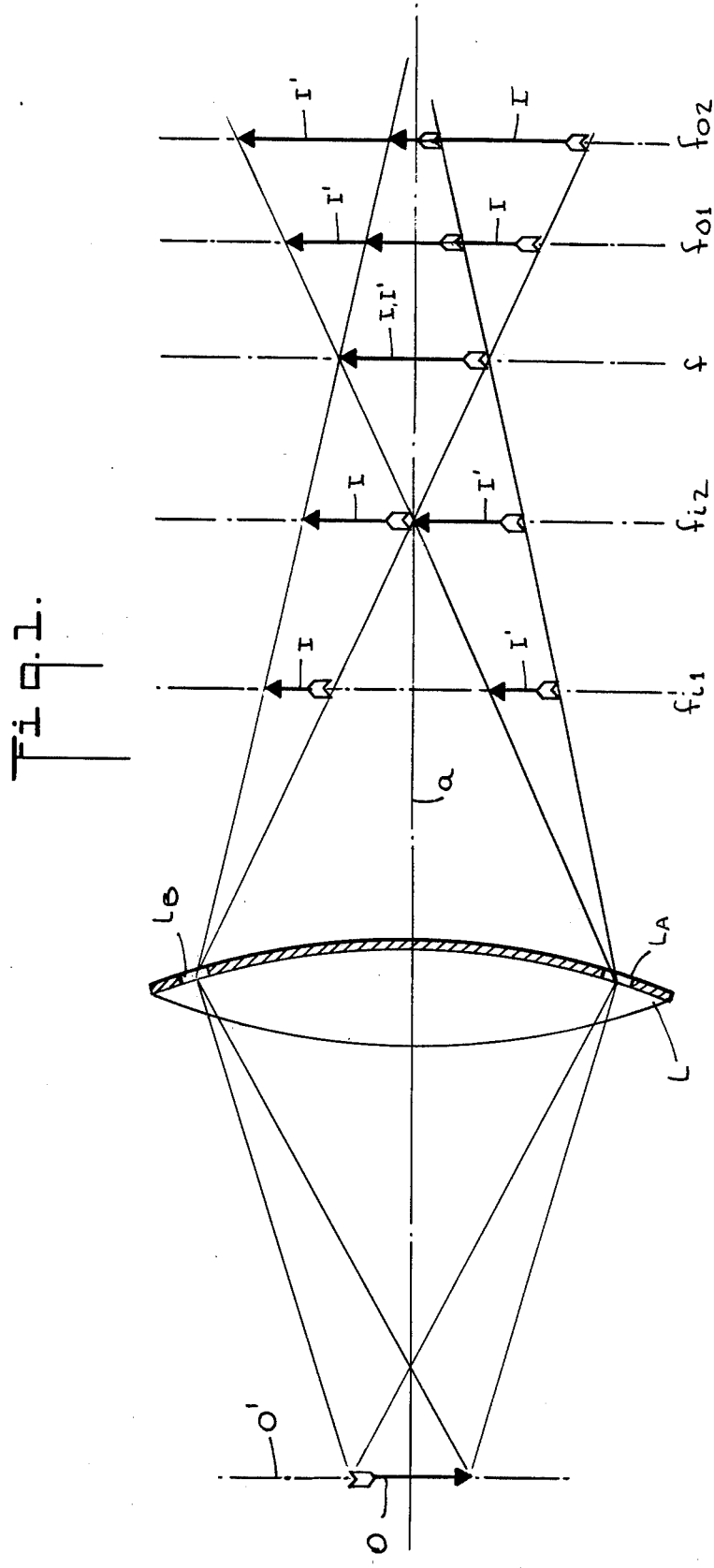

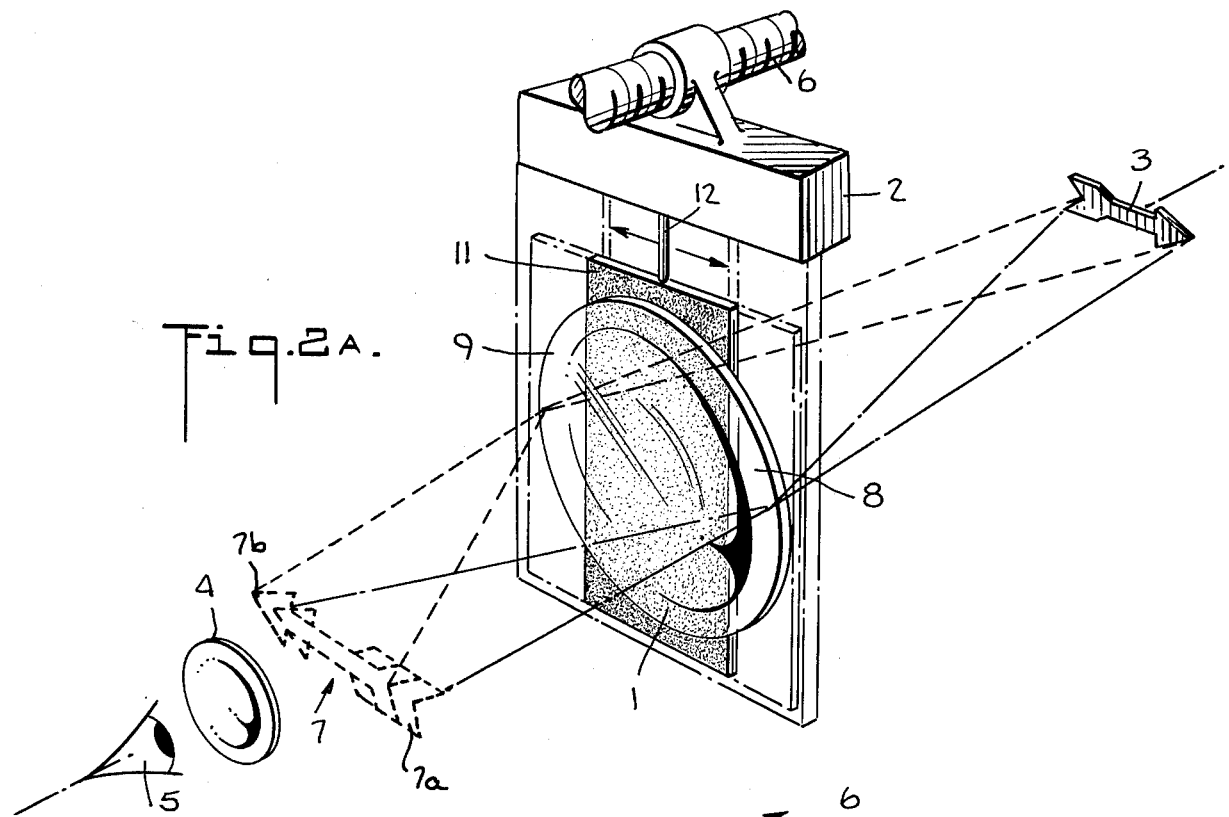
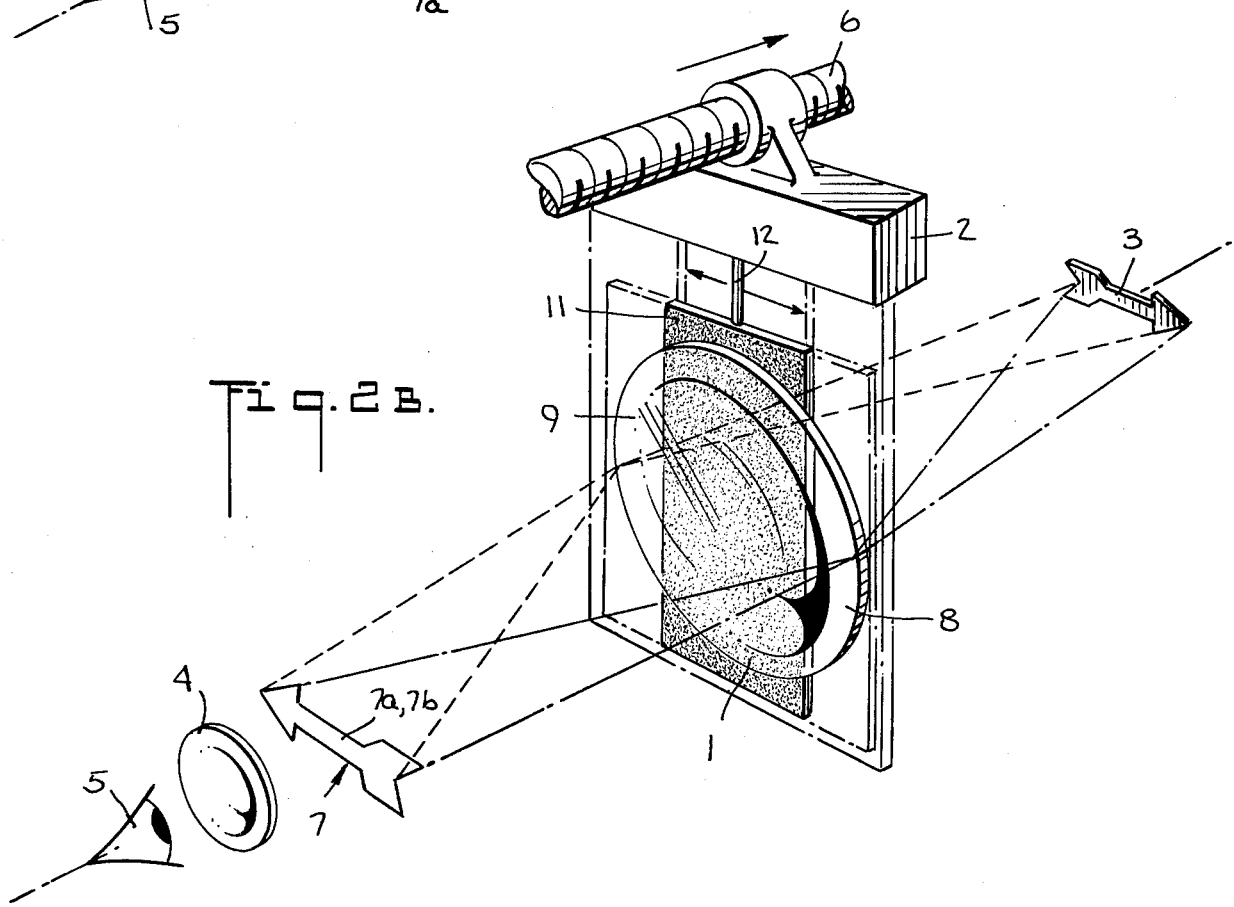

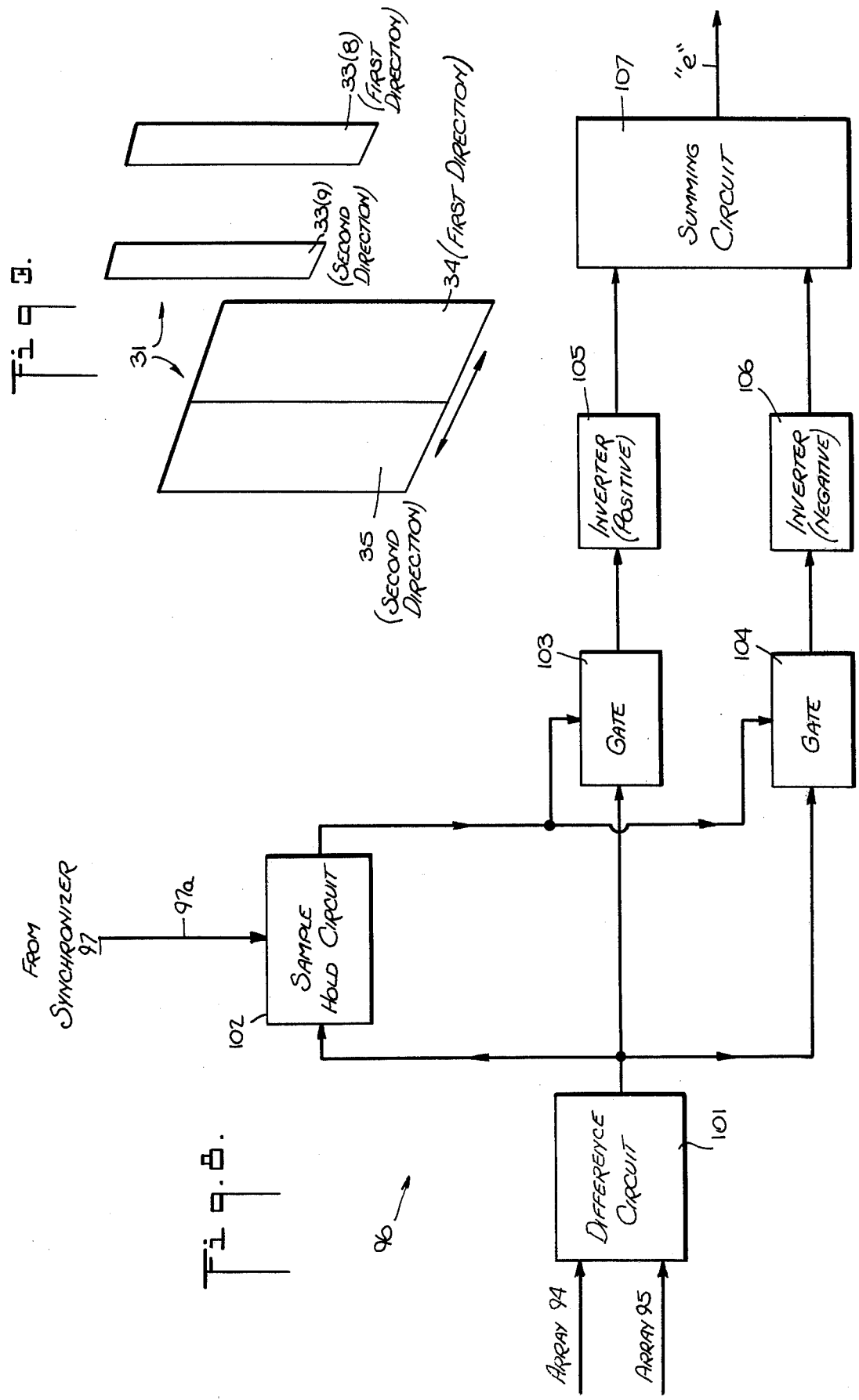

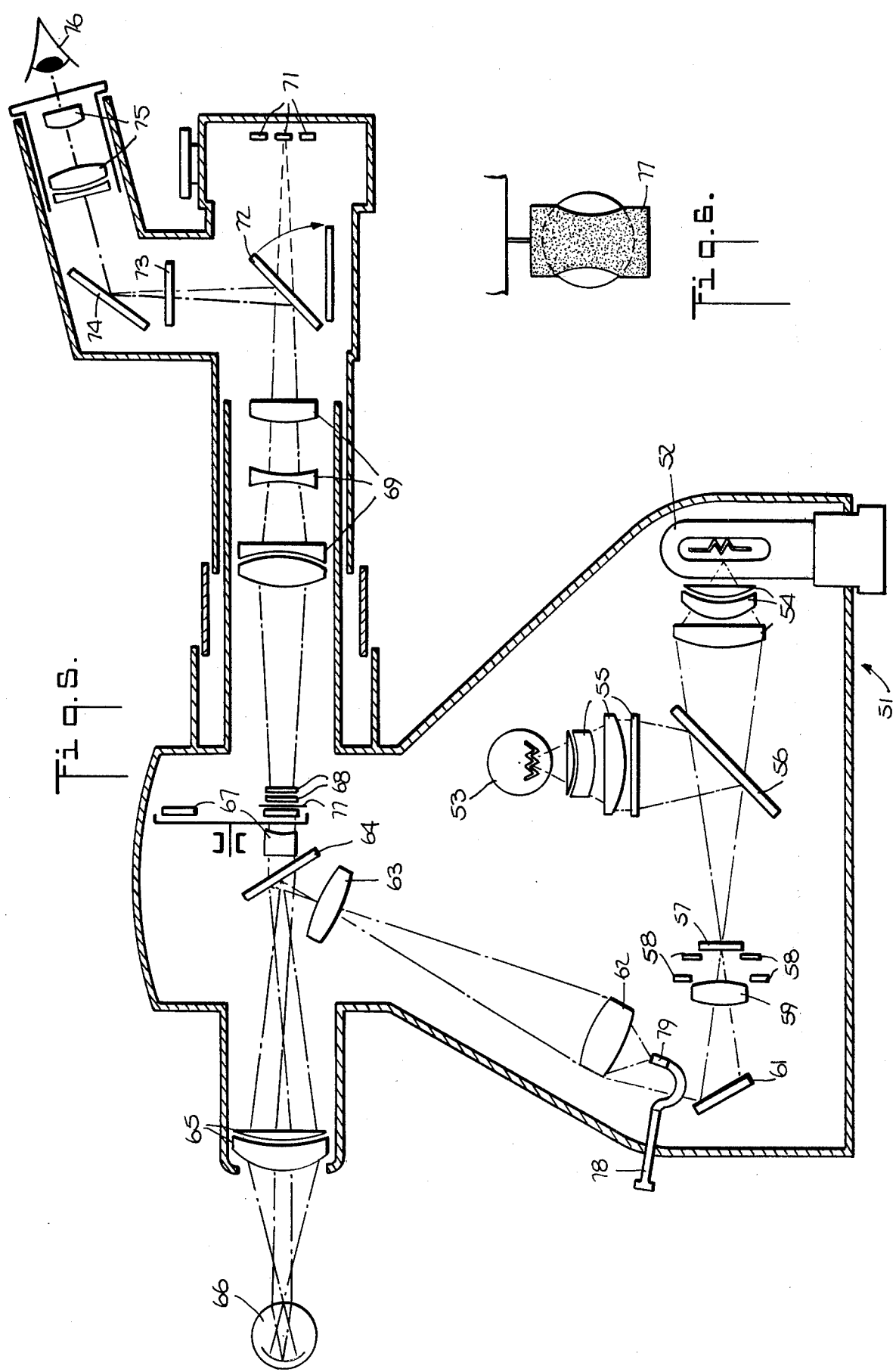

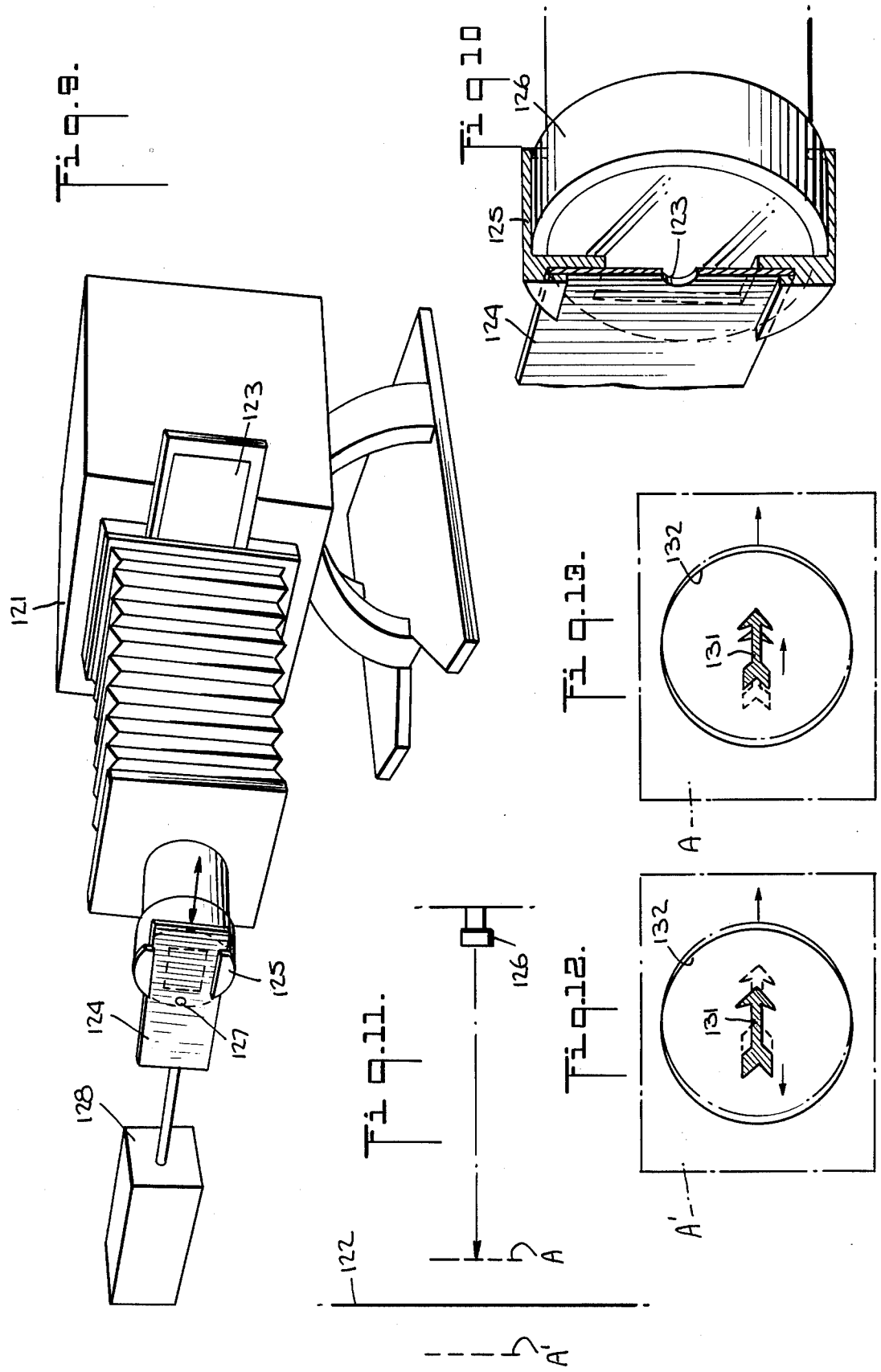

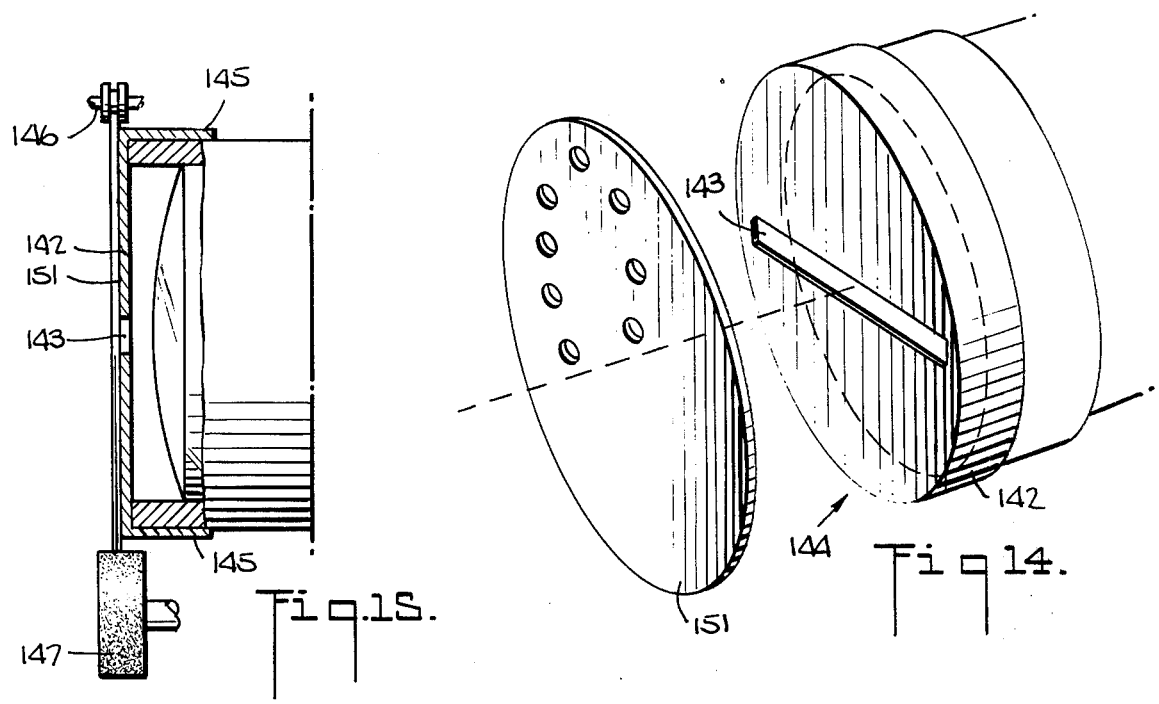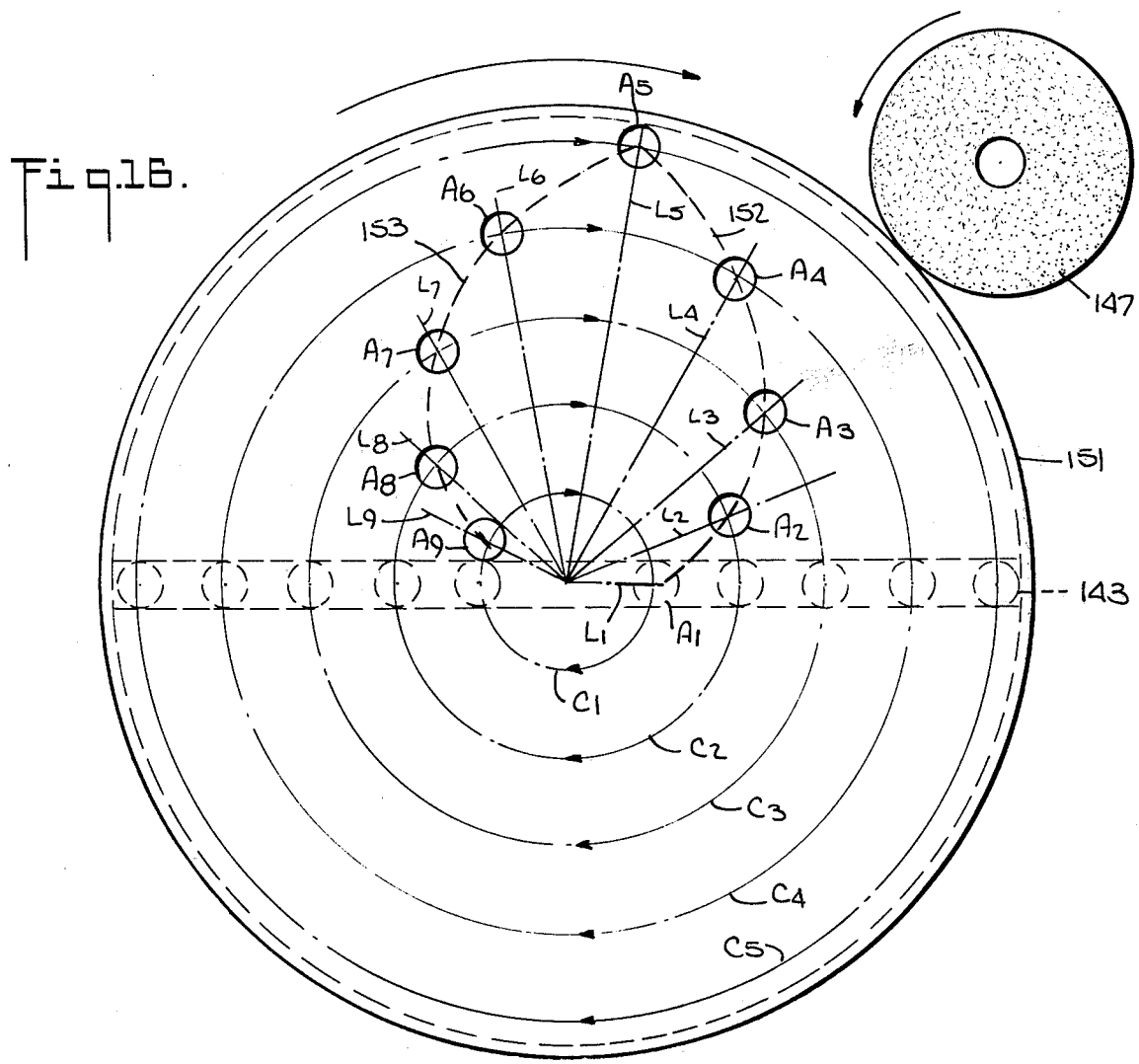

METHOD AND APPARATUS FOR DETECTING THE FOCUSING CONDITION OF AN OPTICAL SYSTEM

BACKGROUND OF THE INVENTION

1. Field of the Invention

The invention pertains to optical systems for imaging objects and in particular to a method and apparatus for enabling more accurate focusing of such systems. Optical systems for producing an image are well known in the art. Such optical systems include projection systems and various types of cameras in which an object is imaged on an image plane.

2. Description of the Prior Art

In order to insure that optical systems accurately reproduce an object at the image plane, such systems are often provided with detection apparatus for determining whether the system is in focus or out of focus. In addition, such systems commonly include an adjustment mechanism for automatically or manually adjusting the optical system in order to establish and maintain focused condition. Typically, in manually focused camera systems the aforesaid detection apparatus is in the form of an optical range finder. The range finder presents the photographer with an image of the object whose condition is indicative of the focusing condition of the optical system of the camera. Thus in one type of a conventional range finder, the clarity of the range finder image is the condition which must be ascertained. In this type of range finder, microprisms may be provided to emphasize the out of focus condition. Thus the image appears either blurred, when the optical system of the camera is out of focus, or the image appears sharp, when the optical system is in focus.

In a second type of conventional range finder, the condition which must be determined is the degree of alignment between two different portions of the range finder image. In this type of range finder, bringing the optical system into focus causes the portions of the image to be brought into exact alignment, thereby causing the previously non-aligned, i.e., split image, to become a single image indicative of a properly focused condition. When the lens is adjusted to align the bottom and top portions of the image (i.e., to bring the two double images into exact registration) the in-focus condition is thus realized.

As above indicated, systems for providing automatic focusing of the optical system of a camera have also been disclosed in the prior art. One type of arrangement based upon the formation of a double image is disclosed in U.S. Pat. No. 3,511,156 which issued on May 12, 1970 to Leonard Larks. In the aforesaid arrangement, double images are formed at an image plane and are purposely separated along a direction orthogonal to the direction along which they are separated due to the out of focus condition of the lens system. The images are then both caused to scan the image plane in the latter separation direction. Due to their separation, one image begins and ends its scan before the other image commences to scan. Light detectors are provided to respond to each image and to generate electrical signals which are displaced in phase by an amount which is indicative of the image separation. In turn, the image separation is indicative of the out of focus condition of the lens system. These electrical signals are then used to control a servo-mechanism which adjusts the lens system to reduce the phase displacement to zero, thereby bringing the lens system into focus.

Another known system for focusing an optical system using multiple images is disclosed in U.S. Pat. No. 3,784,305, issued to Rudolf Hartman on Jan. 8, 1974. In the system disclosed in the aforesaid patent, an image forming lens is placed in the path of the light rays emanating from an object and being imaged by an optical system onto the image plane. The lens is then rotated about its rear-most point so as to displace the front end of the optical axis. If the optical system is in focus, the rotation of the lens is found to have no effect on the image at the image plane. If the optical system is out of focus, the image at the image plane moves laterally. With this focusing system, the focus condition of the optical system is detected by the movement or lack of movement of the image being viewed in response to oscillation of the imaging forming lens.

The arrangements discussed above for detecting the focusing condition of an optical system have proven unsatisfactory under conditions during which the viewer can not accurately perceive when the image is no longer clear and sharp or when the split images are not precisely aligned.

SUMMARY OF THE INVENTION

It is therefore a primary object of the present invention to provide an improved focusing detection arrangement and method.

It is a further object of the invention to provide an improved focusing detection arrangement and method for an optical system in which image condition is employed to indicate the in focus and out of focus condition of the optical system.

The present invention comprises an arrangement for sensing the focus condition of an optical system. An obstruction means is provided which has at least two states in which it forms first and second images of the object in a predetermined image plane. The first and second images formed by the obstruction means exactly coincide when the optical system is in focus. The first and second images are displaced when the optical system is out of focus. Additionally, a second means is provided for alternating the masking means between its first and second states to form the first and second images.

The alternate formation of the first and second images causes a viewer to see an apparently moving image whenever the first and second images remain separated, i.e., whenever the optical system remains out of focus. When the system is adjusted to be in focus, the apparent movement ceases since the images exactly coincide. With the present arrangement, a viewer can determine the focusing condition of the optical system by determining whether there is movement or lack of movement of the image. Since a viewer's perception of movement is typically more sensitive and discriminating as compared to his perception of a blurred or coincident images, a more reliable and accurate detection of the focusing condition of the optical system is thereby realized.

Several embodiments of the aforesaid apparatus are disclosed hereinbelow. In one embodiment, the focusing detection arrangement is incorporated into a single lens reflex camera system and in a second embodiment into a fundus camera system. In both these embodiments, the obstruction means of the focusing detection arrangement is in the form of a light-blocking member which can be positioned in a first position to obstruct all but a first segment and in a second position to obstruct all but a second segment of the optical path being focused by the camera lens system to form the image at the image plane. Moreover, in each of the systems, the second means acts to reciprocate the obstruction between the aforesaid positions.

In another embodiment of the invention, the focusing detection arrangement is incorporated into an optical projection system.

In a further aspect of the invention, the focusing detection arrangement is provided with means for automatically focusing the optical system. The aforesaid means comprises first and second arrays of light sensors which are disposed on opposite sides of a predetermined plane upon which an image is to be focused. In addition there is included means for processing the signals from the arrays, means for synchronizing operation of the processor with the change of state of the obstruction means, and a servo-mechanism for adjusting the optical system in response to the output signals from the processor.

In still a further aspect of the invention the obstruction means has a continuum of states in which a continuum of images are produced on a predetermined image plane. A stationary image is formed on the aforesaid plane when the optical system is in focus and a continuously moving image is formed when the optical system is out of focus.

BRIEF DESCRIPTION OF THE DRAWINGS

The above and other aspects and features of the present invention will become more apparent upon reading the following detailed description in conjunction with the accompanying drawings, in which:

FIG. 1 is a diagramatic representation of an arrangement for detecting the focusing condition of an optical system;

FIG. 2A is a representation in perspective of an embodiment of the invention when the optical system is out of a focused condition;

FIG. 2B is a representation in perspective of an embodiment of the inventor when the optical system is in a focused condition.

FIG. 3 is a schematic representation of a polarization type obstruction means which can be employed in the arrangement of FIGS. 2A and 2B;

FIG. 5 is a vertical section view of a fundus camera which has been modified to include the focusing detection arrangement of the invention;

FIG. 6 is an enlarged elevational view of the obstruction means of the invention used in the fundus camera of FIG. 5;

FIG. 8 is a block diagram representation of the signal processor of the focusing detection arrangement of FIG. 7;

FIG. 9 is a perspective view of another embodiment of an apparatus in accordance with the invention which is used for detecting the focusing condition of a projection system;

FIG. 10 is a fragmentary perspective view of the obstruction means of the apparatus of FIG. 9;

FIG. 11 illustrates two image planes, one being outside and the other being inside the correct focal plane of the projector of FIG. 9;

FIGS. 12 and 13, show the images produced on the two image planes of FIG. 11 by the projector of FIG. 9 as a result of movement of the obstruction of the focusing apparatus of FIG. 9;

FIGS. 14, 15 and 16 respectively comprise perspective, vertical section and front elevational views of an obstruction means which can be employed in the apparatus of FIG. 9.

DETAILED DESCRIPTION

Figure 4:
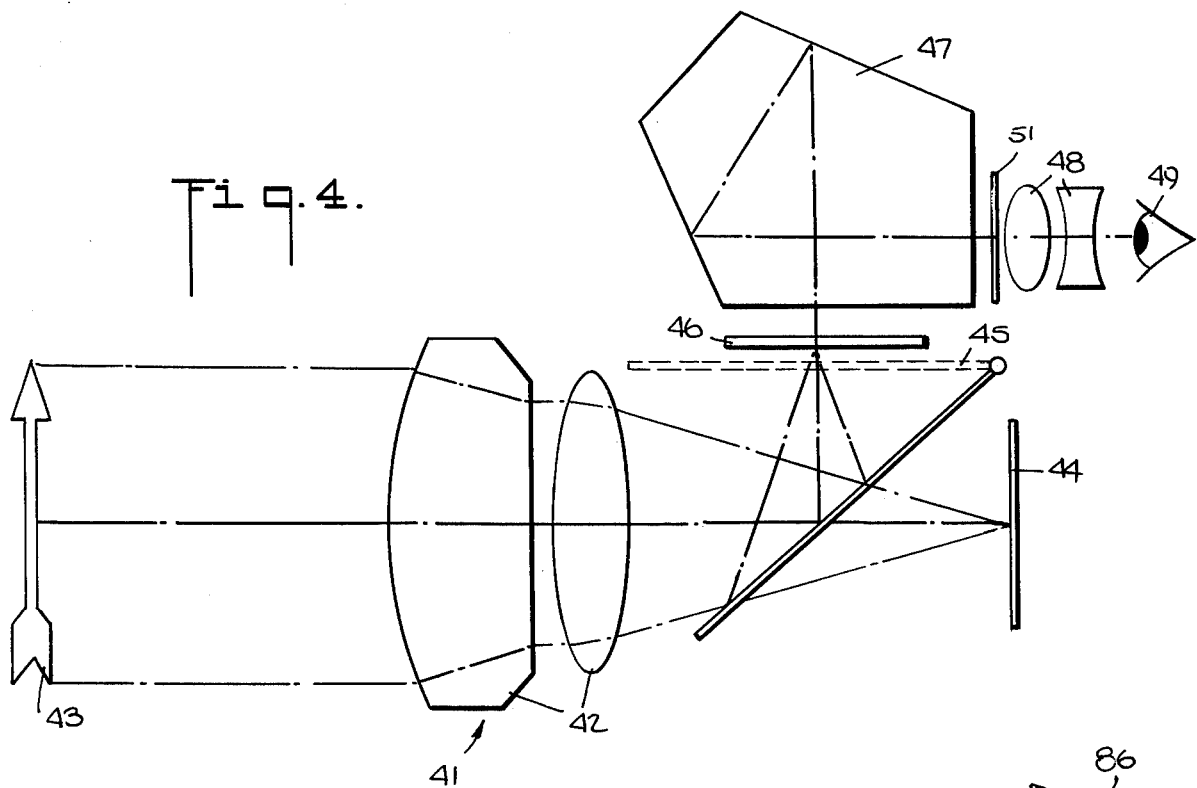
FIG. 4 is a diagramatic representation of a single lens reflex camera which has been modified to include a focusing detection arrangement similar to that in FIG. 1.

FIG. 1 shows the images formed by a lens L which is obstructed except for two small diametrically opposite regions $L_A$ and $L_B$. These regions $L_A$ and $L_B$ may be small circular regions or regions which extends across the entire face of the lens. The images being formed by the lens are of an object 0 which is located at an object plane 0'.

As is well known from the theory of Abbé, the image formed by the lens L when the lens is unobstructed comprises an infinite number of overlapping images, each being formed by an infinitesimal portion of the lens. As is also known, at the focal plane f of the lens L, the aforesaid overlapping images exactly coincide to give a clear single image of the object. At planes displaced to the right and left of the focal plane as viewed in FIG. 1, the aforesaid images do not coincide, but instead are displaced one from the other. The aforesaid displacement between the large number of overlapping images in the aforesaid displaced planes, thus, results in images being produced therein which are substantially obscured.

It has been previously recognized that by obstructing all but small portions of the lens L, a large number of the infinitesimal lens portions producing images are prevented from doing so. As a result, at the planes displaced from the focal plane, a small number of discernible images are formed, each resulting from a particular unobstructed lens portion.

It has been further recognized that an in focus or an out of focus condition of the lens L relative to a predetermined image plane can be ascertained by obstructing the lens in the aforesaid manner and examining the nature of the image or images appearing in the predetermined plane. More particularly, if displaced images are produced in the given plane, the given plane must be displaced from the focal plane of the lens and therefore the lens is out of focus. If a single image is produced, then this, in turn, indicates that the plane is at the focal plane of the lens and, therefore, that the lens is in focus.

In the case where displaced images are formed, it has also been recognized that the direction in which the lens L must be moved to be brought into focus with the respect to the predetermined image plane can be determined by the direction of displacement of the images in the plane relative to the axis of the lens. More particularly, if the image formed by a particular lens portion is shifted relative to the axis of the lens in the same direction as the lens portion is displaced therefrom, then the lens is focused beyond the predetermined plane. In such case, the lens must be moved away from the predetermined plane (toward the object) to be brought in focus at such plane. On the other hand, if the image formed by a particular unobstructed lens portion is shifted relative to the axis of the lens in the opposite direction as the lens portion is displaced therefrom, then the lens is focused inside the predetermined plane. In this case, the lens must be moved toward the predetermined plane (away from the object) to achieve focus at such plane.

The above principles are illustrated by the images formed by the unobstructed lens portions $L_A$ and $L_B$ of FIG. 1. More particularly, in FIG. 1 the images of the object 0 produced by the lens portions $L_A$ and $L_B$ have been determined by tracing the ray paths followed by the extreme rays of the object. These ray paths extend from the object plane, through the respective lens portions of the focal plane f of the lens, where all images are coincident.

As can be seen from the figure, images I' and I are formed by the lens portions $L_A$ and $L_B$, respectively, at all image planes beyond and inside of the focal plane f of the lens L. At the image planes inside of the focal plane f (i.e., at planes $f_{i1}$ and $f_{i2}$), the images I and I' are laterally displaced to the left and right of the axis a, as are their respective lens portions $L_B$ and $L_A$. At image planes beyond the focal plane f (i.e., at planes $f_{o1}$ and $f_{o2}$), the images I and I' are displaced to the right and left, respectively, of the axis a, and, thus, are displaced oppositely to the aforesaid displacement of their respective lens portions $L_A$ and $L_B$. Finally, at the focal plane f, the two images I' and I coincide, thereby forming a single image.

FIGS. 2A and 2B show in schematic fashion an arrangement for focusing an optical system in accordance with the principles of the present invention. More particularly, in FIGS. 2A and 2B, there is shown an optical system having a lens 1. Lens 1 which is supported in a holder 2 provides a focused image of an object 3 at an eye piece 4 for viewing by the eye 5 of a viewer. The holder 2 is fixedly attached to a threaded rod 6 which permits translation of the lens 1 toward or away from the object 3. Rotation of the threaded rod in response to a command from the viewer occurs when an out of focus condition is detected by the viewer.

In accordance with the invention, the viewer 5 causes the position of lens 1 to be changed when he perceives apparent movement of the image 7 he is viewing. More particularly, in further accord with the invention, the viewer 5 sees either an apparent movement of the image 7 when the lens 1 is out of focus and no apparent movement or a stationary image when such lens is in focus. Thus, in the former case the viewer 5 activates rod 6 to bring the lens into focus, while in the latter case no such activation occurs.

In the arrangement of FIGS. 2A, 2B and 3 the aforesaid stationary and apparent moving images are produced when the lens 1 is in focus and out of focus, respectively, by including therein a movable obstruction means. The obstruction means is alternately moved from a first operative position in which it obstructs all but a first segment 8 of the lens 1 to a second operative position where it obstructs all but a second diametrically opposite segment 9 of the lens 1. As shown, the obstruction means is in the form of a rectangular mask 11 having a vertical dimension which is greater than the lens diameter and a horizontal dimension which is less than such diameter. The mask 11 is held by a support 12 in a slot (not shown) of the frame 2 in order to be translatable from side-to-side in the horizontal direction. Thus, movement of the mask in one sense (to the left looking at the drawings of FIGS. 2A and 2B) exposes only the lens segment 8 of the lens 1 while movement in the opposite sense (to the right looking at the drawings of FIGS. 2A and 2B) exposes only the lens segment 9 of the lens.

As discussed above, when all but diametrically opposite segments of a lens are masked, two images are produced at an image plane of the lens which will exactly coincide when the lens is in focus with respect to the image plane and which will be displaced when the lens is out of focus with respect to such plane. When the mask 11 exposes the lens segment 8, a first image 7a is produced which is associated with the segment 8, and when it exposes the lens segment 9 a second image 7b is produced which corresponds to the segment 9. Moreover, if the lens is in focus during the exposure of each segment, the images 7a and 7b are formed at the same location, (the condition depicted in FIG. 2B), with the result that the viewer perceiving the image 7 sees no change or apparent movement of the image as the mask 11 is moved. If, on the other hand, the lens is out of focus (the condition depicted in FIG. 2A), the viewer first sees image 7a and secondly the second image 7b displaced from image 7a with the result that the image 7 appears to move from one position to another position as the mask 11 is moved. Such apparent motion or lack of apparent motion is, therefore, indicative to the viewer of the focusing condition of the lens 1.

More particularly, when the viewer sees an apparent movement or flicker of the image 7, he knows that the lens 1 is out of focus and responds to this condition by activating movement of the bar 6 in a first direction to attempt to bring the lens into focus. If movement of the bar in this direction results in continued apparent movement of the image 7 and the movement is over a greater distance, the viewer is thereby made aware that he is adjusting the lens further out of focus. The viewer thereby realizes that he should be moving the lens 1 in the opposite direction. By doing so he will reach a point where the images 7a and 7b coincide and, thus, will cause the image 7 to be stationary. At this point in time, the viewer is made aware that an in focus condition has been achieved.

The movement of mask 11 can be arranged to experience dwell at its extreme right and left end positions. The rate at which the mask is moved between these two positions to expose the lens segments 8 and 9 alternately is determined in view of a number of factors, one of which is the persistence of vision of the human eye. In practice, a speed of approximately 10 cycles per second can be used.

FIG. 3 illustrates another obstruction means 31 which can be used in place of the mask 11 in the apparatus of FIGS. 2A and 2B to obstruct alternately all but the light passing through segments 8 and 9 of the lens 1. This obstruction means comprises two stationary rectangular polarizing members 32 and 33 which are separated and which are adapted to polarize light passing therethrough in first and second directions, respectively. Positioned in front of the members 32 and 33 is a movable polarization analyzer having two rectangular portions 34 and 35. The portions 34 and 35 are adapted, respectively, to pass light polarized in the aforesaid first and second directions.

When used in place of the mask 11, the polarizing members 32 and 33 are positioned to overlie the segments 8 and 9 of the lens 1 and the analyzer is alternately moved to the extreme left and right in the same manner as the mask 11 is moved. When the analyzer is in an extreme left position, light passes from the lens 1 through segment 8 only since light polarized by polarizer 33 will be intercepted by analyzer portion 34 and will be blocked. Similarly, when in the extreme right position, light will pass from the lens 1 only through the segment 9 since light polarized by polarizer 32 will be intercepted by analyzer portion 35 and will be blocked.

FIG. 4 shows in schematic fashion the optical system of a single lens reflex photographic camera 41 modified to include a focusing arrangement of the type described in FIGS. 2A and 2B.

The objective lens system 42 of the camera focuses the image of an object 43 onto the image or film plane 44 of the camera. In order to ensure that the image is properly focused on the film plane 44, the camera is provided with a view finder system comprising a hinged mirror 45 which intersects the image from the objective, a ground glass surface 46 upon which an image of the object is formed a pentaprism 47 and a lens system 48 for conveying the image on the glass 45 to the eye 49 of the viewer. With this type of view finder, a condition of focus on glass surface 46 causes image 43 to be focused by the objective 42 on the film plane 44.

In accordance with the present invention, the camera 41 is additionally provided with a movable obstruction 51 analagous to the mask of FIG. 2A and 2B. The obstruction 51 is positioned in the camera optical system at a location to cause the image on the ground glass surface 46 being seen by the viewer 49 to have apparent motion when the camera is out of focus and to be stationary when the camera is in focus. In the illustrated case, the obstruction 51 is positioned alternately to obscure diametrically opposite portions of the lens system 48 and thereby create the aforesaid moving or stationary image. it should be noted that the obstruction 51 can also be positioned to obscure corresponding segments of the lens system 42 or to obscure corresponding segments of the image being focused at some intermediate position between the lens systems.

With the obstruction 51 included in the camera 41, the viewer focuses the camera in the usual manner while being guided by the movement of the image being viewed. When the movement stops, a correct focus condition has been reached.

FIG. 5 shows the optical system of a fundus camera such as the type of fundus cameras manufactured by Carl Zeiss of the Federal Republic of Germany. Such a fundus camera 51 is shown as being modified to include a focusing arrangement for facilitating and improving photographing the inside of the eye. Camera 51 is provided with an electronic flash tube 52 as a light source for photographic purposes. Lamp 53 is a source of light for focusing the camera with respect to the inner portion of an eye which is to be photographed. Lamp 53 projects light by means of lens assembly 55, and half-silvered mirror 56 onto a glass plate 57. The light from the plate, in turn, passes through stops 58 and is transmitted by the lens 59, mirror 61, lens 62, lens 63 and half-silvered mirror 64 to the optical axis of the carmera. Mirror 64 directs the focusing light toward the objective 65 of the lens system which in turn directs the light onto the retina of the eye 66 to be photographed. Focusing light reflected from the retina is directed by the objective 65 through mirror 64, lens 67, astigmatism compensator 68 and a second objective lens system 69 to film plane 71.

To facilitate proper focusing of the camera 51, it is provided with a view finder system comprising a hinged mirror 72, an eyepiece recticle 73, a mirror 74 and lens system 75. As in the previous case of the single lens reflex camera, the mirror 72 and recticle 73 are positioned so that when image of the illuminated retina is focused on the film plane 71, it is simultaneously focused on the recticle 73 for viewing by the eye 76 of a viewer by means of the mirror 74 and lens system 75.

In accordance with the invention, the camera 51 is provided with a movable obstruction 77 which causes the image being viewed by the eye 76 of the viewer to appear to move when the optical system of the camera is out of focus and to be stationary when the optical system is in focus. The movable obstruction 77 is positioned to alternately obstruct all but diametrically opposite segments of the beam of light being focused by lens system 69 onto the image plane 71 and, thus, onto the recticle 73. More particularly, as shown in FIGS. 5 and 6, the obstruction 77 is in the form of a substantially rectangular mask having vertically extending sides which are partially concave. The mask is situated between the lens system 67 and the astigmatism compensator 68. When the mask 77 is moved left and right, alternate diametrically opposite portions of the beam passing through compensator 68 are exposed. The effect of the mask 77 is thus analagous to that of the mask of FIGS. 2A and 2B. The image being observed by a viewer will therefore appear to move if the camera is out of focus and will appear stationary if the camera is in focus. Focusing of the camera is thereby facilitated. The moving of the appropriate lens system is continued until the camera is in focus as evidenced by no further movement of the image being observed.

Further in accordance with the invention, the focusing arrangement of the camera 51 is provided with a means for forming an optical reference signal in the object plane, i.e., on the retina of the eye being photographed. This means includes a light source 78 which couples light by means of optical fiber, strand or bundle 79 to a location between the mirror 61 and lens 62. This light is projected by the optical system including lens 62, lens 63, mirror 64 and objective 65 onto the retina of the eye being photographed. The projected light forms a luminous spot on the retina which need not necessarily be in focus on the retina. The movement of the spot in response to the movement of mask 77 is easily discernible by the viewer when focusing the lens system of the camera 51.

It should be noted that the obstruction 77 and optical fiber bundle 79 are movably mounted in their respective positions. Thus, after focusing has been carried out, these elements are moved out of the respective light paths in order not to interfere with the light path of the image to be photographed.

Figure 7:
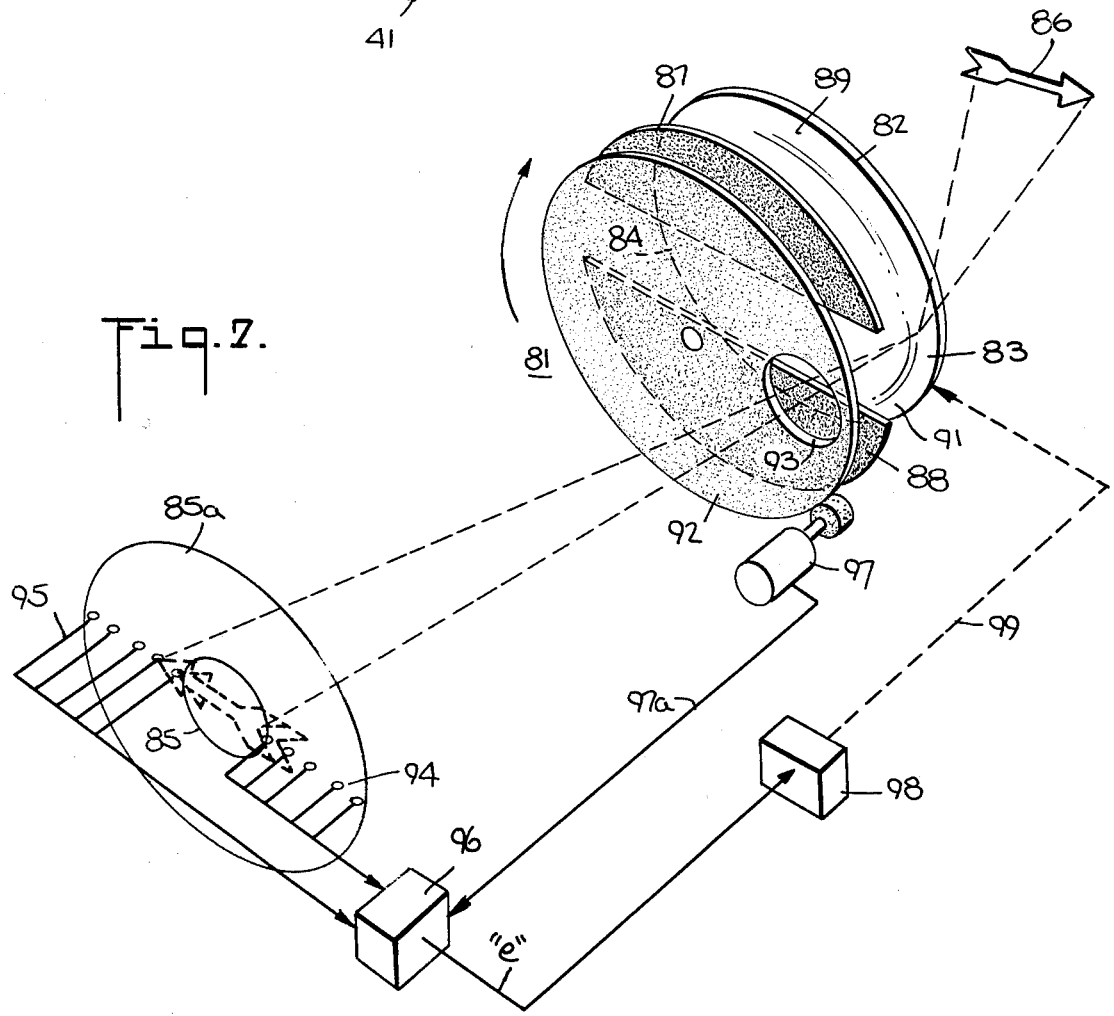
FIG. 7 is a diagramatic representation in perspective of a focusing detection arrangement in accordance with the invention in which further means are included for developing a control signal and for using the control signal to focus the optical system automatically.

FIG. 7 illustrates another aspect of the present invention in which a focusing arrangement analagous to that shown in FIG. 1 is modified. The modified focusing arrangement includes means for generating an electrical control signal which is indicative of the apparent movement or lack of apparent movement of the image being formed by the focusing arrangement. Means are also provided for automatically repositioning the lens in response to such a signal.

The focusing arrangement of FIG. 7 comprises an obstruction or mask 81 which alternately blocks diametrically opposite lens segments 83 and 84 of a lens 82 which is to provide an image 85 of an object 86. The obstruction 81 comprises fixed masks 87 and 88 which mask, respectively, top and bottom segments 89 and 91 of the lens 82 adjacent the respective segments 83 and 84. The obstruction 81 further includes a rotating mask 92 which is situated in front of the fixed masks and which has an aperture 93 adjacent its periphery.

Rotation of the mask 92 causes the aperture 93 to expose alternately the diametrically opposite lens segments 83 and 84. Light is thus passed to the image plane 85a in a manner analogous to that shown in FIGS. 2A and 2B. The image 85 being formed will hence exhibit apparent movement when the lens 82 is out of focus and will be stationary when the lens 82 is in focus.

To detect the aforesaid two conditions of the image being formed, two arrays of light sensors 94 and 95 are mounted at the image plane 85a. In particular, the arrays 94 and 95 are disposed at oppositely disposed portions of the image plane and sufficiently toward the outskirts thereof, in order that when the lens 82 is in focus, the stationary image produced thereby does not impinge on either array.

The outputs of the detector arrays, in turn, are applied to a signal processor 96 whose operation is synchronized with the rotation of mask 92 by the signal on line 97a from a synchronizing means 97 which is in contact with the periphery of the mask 92. The output signal "e" from the processor 96 is a signal indicative of the movement of the image 85 and, in particular, has an output characteristic which represents the direction by which the lens 82 is out of focus. The signal "e" is applied to a conventional position servo-mechanism 98 which in response thereto, acts to reposition the lens 82 in a manner which brings the lens into focus and, thus, causes a stopping of the movement of the image 85. The aforesaid action of the servo-mechanism 98 on the lens 82 is indicated in FIG. 7 schematically by the connecting line 99.

FIG. 8 illustrates the signal processor 96 of FIG. 7 in greater detail. As shown, processor 96 includes a difference circuit 101 into which is fed the signals from the arrays 94 and 95 and which subtracts the latter from the former. The difference signal generated by the circuit 101 is coupled therefrom to a sample-and-hold circuit 102, whose sampling is controlled by the synchronizing signal from synchronizer 97. The difference signal is also coupled to two gates 103 and 104 whose gating operations are controlled by the sample-and-hold circuit output signal. The outputs of the latter two gates are, in turn, coupled to selective positive and negative inversion circuits, 105 and 106, respectively. The summing circuit 107 sums the outputs from the two inversion circuits to thereby generate the control signal "e".

As can be appreciated, the polarity of the signals being coupled to circuit 101 from diode arrays 94 and 95 will depend upon the direction by which the lens 82 is out of focus. In particular, as discussed above, if the lens is out of focus in the sense of being too close to the image plane, then the images produced by the scanning aperture 93 will be shifted toward the image plane halves occupied by their respective lens segments and, hence, so as they impinge on the arrays 94 and 95, respectively. In such case, therefore, the array 94 produces a positive output and the array 95 a zero output when the segment 83 is being scanned and, similarly, the array 94 produces a zero output and the array 95 a positive output when the segment 84 is being scanned. On the other hand, as also discussed above, when the lens is out of focus in the opposite sense, i.e., in the sense of being too far from the image plane 85a, the images produced will be shifted away from their respective image plane halves and, hence, the images from segments 83 and 84 will impinge on arrays 95 and 94, respectively. In this second case, therefore, the array 94 produces a positive signal and the array 95 a zero signal when segment 84 is being scanned. Likewise, when the segment 83 is being scanned the output of array 95 is positive and that of array 94 substantially zero.

From the above, it is thus apparent that the output signals developed by difference circuit 101 of processor 96 for the two senses of the out of focus condition of the lens 82 will be alternating polarity signals which are 180° out-of-phase. The remaining circuitry of the processor thus acts to convert one of these alternating polarity signals into a positive polarity signal and the other into a negative polarity signal, thereby providing the signal "e" with polarities indicative of the sense of the out-of-focus condition of the lens 82. In the particular case shown, the signal "e" is caused to have a positive polarity when the lens 82 is too close to the image plane 85a and a negative polarity when it is too far from such plane.

More particularly, the signal from difference circuit 101 is coupled to sample-and-hold circuit 102 which is controlled by the synchronizer signal from synchronizer 97 to sample the difference signal when the aperture 93 of mask 92 is scanning only one of the lens segments. In the present case, sampling is carried out when the segment 83 is being scanned. The circuit then holds the sampled amplitude during the scanning of the segment 84 and until the segment 83 is again scanned and sampling again occurs. The sampled difference signal and, thus, the output of the circuit 102 will therefore have a positive polarity when the lens 82 is too close to the image plane, since during this time scanning of the lens segment 83 results in positive signal from array 94 and a substantially zero signal from array 95. Similarly, the sampled signal and, thus, the output from circuit 102 will be negative when the lens 82 is too far from the image plane, owing to the positive signal from array 95 and the zero signal from array 94 occurring at this time. The polarity of the output signal from circuit 102 wil thus be indicative of the sense by which lens 82 is out of focus.

The aforesaid sampled output signal is applied to the gates 103 and 104 and controls the passage therethrough of the difference signal from circuit 101 which is being applied to each gate. In particular, the gate 103 is controlled to permit passage only when the sampled output is negative and the gate 104 only when the sampled output is positive. Thus, the output from gate 103 follows the difference signal at all times when the lens is too close to the image plane and is zero otherwise, and the gate 104 follows the difference signal at all times when the lens is too close to the image plane and is zero otherwise.

The outputs from the gates 103 and 104 are then coupled to the respective inversion circuits 105 and 106. As indicated, the former inversion circuit 105 inverts only the positive portions of its input signal, while the latter inversion circuit 106 inverts only the negative portions thereof. The output of inverter 105 will thus be a negative signal when gate 103 is following the difference signal. Thus the inverter 105 will invert the positive portions of the signal resulting from scanning segment 84 and will be a zero signal otherwise. The output of inverter 106, on the other hand, will be a positive signal when gate 104 is following the difference signal. Thus inverter 106 will invert the negative portions of the signal resulting from scanning segment 83, retain the positive portions resulting from scanning segment 84 and will be zero otherwise. Thus the signal from inverter 105 will be negative at all times when the lens 82 is too far from the image plane and zero at all other times. The signal from inverter 106 will be a positive signal when the lens 82 is too close to the image plane and zero at all other times. The sum signal "e" produced by summing circuit 107 will, accordingly, be one polarity (i.e., negative) when lens 82 is in the former condition and the opposite polarity (i.e., positive) when the lens is in the latter condition, thereby providing a proper control signal for the servo.

FIGS. 9–11 show another focusing arrangement in accordance with the principles of the present invention. This arrangement is adapted for use with a projection system. More particularly, the aforesaid focusing arrangement enables the optical projection system, illustrated as projector 121, to provide a focused image on an image plane, in the form of screen 122, of an object located at the object or slide plane 123 of the projector. In accordance with this aspect of the invention, stationary and moving images are formed on the screen 122, respectively, when the projector is in and out of focus with respect to the image plane, respectively. Thus, again the focus condition of the optical system is detected by perception of movement or lack of movement of the image being formed.

In the present arrangement, the movement of the image during an out of focus condition of the projector is continuous and is brought about by use of an obstruction 124. Obstruction 124 is slidably mounted within a guide 125 which is clamped to the front of the projection lens housing 126. The obstruction 124 is in the form of a mask having a relatively small circular aperture 127. The obstruction, thus, blocks all of the area of the projection lens, except for the portion defined by the aperture 127.

As in the previous arrangements, the obstruction 124 can be moved back and forth across the face of the projection lens by hand or by means of a source of reciprocating mechanical movement 128. This causes the aperture 127 to scan back and forth across the central portion thereof. During such scanning, the aperture 127 acts somewhat analogously to the reciprocating mask 11 of the apparatus of FIGS. 2A and 2B. In this case, however, not only are diametrically opposite segments of the lens alternately permitted to pass light but, additionally, all the circular segments therebetween are also permitted to pass light.

When the projection lens is in focus, the scanning movement of the aperture 127 is accompanied by a stationary image on the screen 122. Such stationary image is indicative of the projection lens being in focus. On the other hand, when the projection lens is out of focus, the scanning of the aperture 127 causes a continuously moving image to be produced on the screen 122. This moving image is caused by the scanning of all segments of the lens and is indicative of the out of focus condition.

When the projection lens of the projector 121 is out of focus, an in focus condition can be realized by movement of the projector lens assembly 126 and, thus, the projection lens in a manner analogous to that in the case of the lens of FIGS. 2A and 2B. Thus the projection lens assembly can be first moved in one direction and, if movement of the image persists, can then be moved in the opposite direction until a position is reached where the image becomes stationary. At this point, the projection lens will be focused on screen 122.

Alternately, in accordance with the invention, the direction of movement of the lens to achieve an in focus condition can be ascertained by making the aperture 127 small enough to cause a discernible image of its edge to appear on the screen 122 as the aperture moves across the face of the projection lens. By comparing the direction of movement of the image adjacent the edge of the aperture appearing on screen 122 with the direction of movement of the image of the object being projected on the screen, the proper direction of movement of the projection lens to bring the lens in focus can be obtained.

In FIG. 12, an image is projected by projector lens 126 onto screen 122 with the projection lens focused at a plane "A'" in front of the screen. In this focusing condition, the image 131 of the projected object moves to left, while the image 132 of the edge of the aperture moves to the right, when the aperture 127 is moved across the lens from left to right. Thus, in this case the image of the edge of the aperture moves in the opposite direction to the direction of movement of the projected image of the object. When this condition (i.e., the projected image of the object and the image of the aperture edge are moving opposite to one another) is thus perceived by the eye or by suitable optical detection means, it becomes clear that the projection lens is focused at the plane A in front of the screen 122 and, hence, must be moved toward the screen to achieve an in focus condition.

FIG. 13 depicts the images appearing on the screen 122 for the situation opposite to that in FIG. 12, i.e., the projector is focused at a plane "A" beyond the screen 122. In this case, the projected object 131 of the image moves to the right as does the image 132 of the edge of the aperture when the aperture moves from left to right. For this out of focus condition, the image 131 thus always moves in the same direction as the image 132. Perception by the eye or suitable detection by an optical detection means of this condition, therefore, is an indication that the projector is focused at the plane A' beyond the screen 122 and that the lens thereof must be moved away from the screen to achieve an in focus condition.

FIGS. 14–16 show an obstruction 144 which can be used in place of the obstruction 123 of FIG. 9 in order to realize an aperture which scans across the face of the projection lens of projector 121. The obstruction comprises a stationary circular mask 142 which has a slot 143 which runs diametrically thereacross. The mask 142 also has extensions 145 which permit the mask to be inserted directly over the frontal portion of the projection lens housing. The obstruction 144 further comprises a rotating circular mask 151 situated in front of the mask 142 which is rotably guided by a guide 146 as it is rotated by the rotating wheel 147 in engagement with its periphery. As shown, the mask 151 has two sets of apertures A1–A5 and A5–A9 having their centers disposed along arcuate paths 152 and 153 respectively. In the illustrative case shown the path 152 is defined by the intersection points of 5 equally spaced concentric circles C1–C5 with 5 radial lines L1–L5 whose angular incline increases incrementally by 20°. The path 153, on the other hand, is defined by the intersections of the latter concentric circles with 5 radial lines starting with the last line defining the path 152 and incremented therefrom by 20° increments, i.e., the lines L5–L9.

As can be appreciated, as the mask 151 rotates clockwise through the rotation of member 147, first the apertures A1 to A5 intersect the slot 143 of the obstruction 142 and result in a succession of apertures moving to the right across the right half portion of the slot. Continued rotation then causes the apertures A6–A9 to intersect the right half portion of slot, thereby causing a succession of apertures to move to the left across the aforesaid portion. The latter succession is then continued to the left by the apertures A1 to A5 as they now cross the left half portion of the slot. Finally, a succession of apertures again move toward the right across the left hand portion of the slot, as the apertures A6 to A9 again intersect the slot. Rotation of mask 151 thus causes the obstruction 141 to generate a moving aperture which moves step-by-step across the diameter of the obstruction and, thus, can be used to simulate the scanning movement of aperture 127 of obstruction 124.

Figure 17:
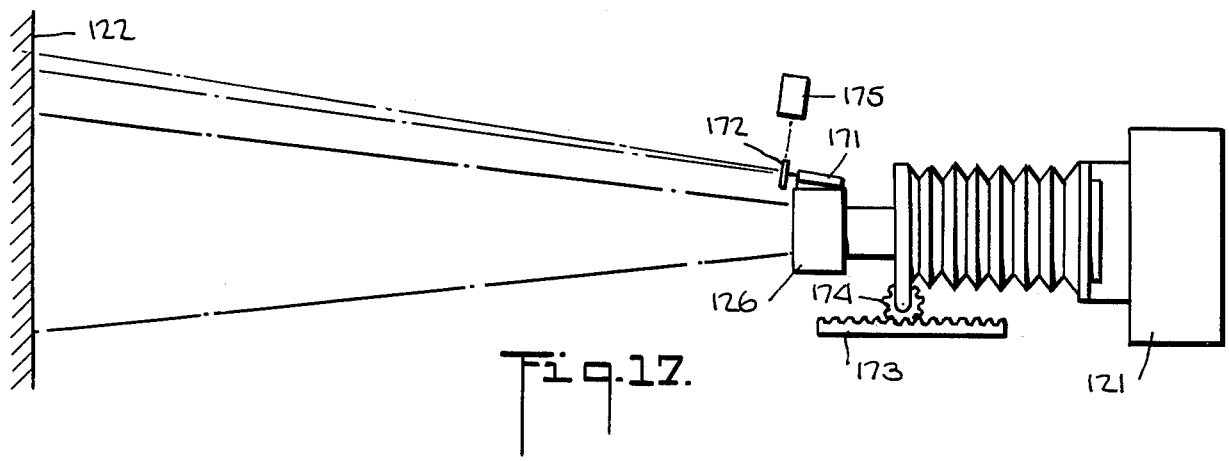
FIG. 17 shows a further embodiment of apparatus in accordance with the invention in which the apparatus produces an image in a manner which does not disturb the image being produced by the projection system being focused.

FIG. 17 shows a further focusing arrangement in accordance with the invention in which the ability to focus is enhanced by providing a moving reference image, without disturbing the image of the object. More particularly, in FIG. 17, the aforesaid reference image is provided by a projected source of light from an auxiliary projection means 171 which is carried on and moves with the projection lens housing 126 of the projector 121. The lens system of the auxiliary projector 171 is designed such that it provides an in focus image on the same plane 122 as the projector 121. Hence, when the projection 121 is in focus and out of focus the auxiliary projector 171 is likewise in and out of focus and, in the latter case, by the same degree. By monitoring the focusing condition of the auxiliary projector 171, the focusing condition of the projector 121 can thus be ascertained without disturbing image being projected thereby.

The aforesaid monitoring of the image from projector 171 is carried out analogously as in FIG. 9 by use of a reciprocating means 175 to move an obstruction means 172 across the face of the projection lens of the projector 171. As discussed above, such movement will cause the image being formed on screen 122 by the projector 171 to either continuously move or remain stationary. In the latter case, the projector 171 and, hence, the projector 121 are in focus and no movement of the latter is required. In the former case, the projector 171 and, thus, the projector 121 are out of focus, and the projector 121 must be moved via the rack 173 and gear 174 until the image from projector 171 becomes stationary, thereby, again indicating an in focus condition for both projectors.

Figure 18:
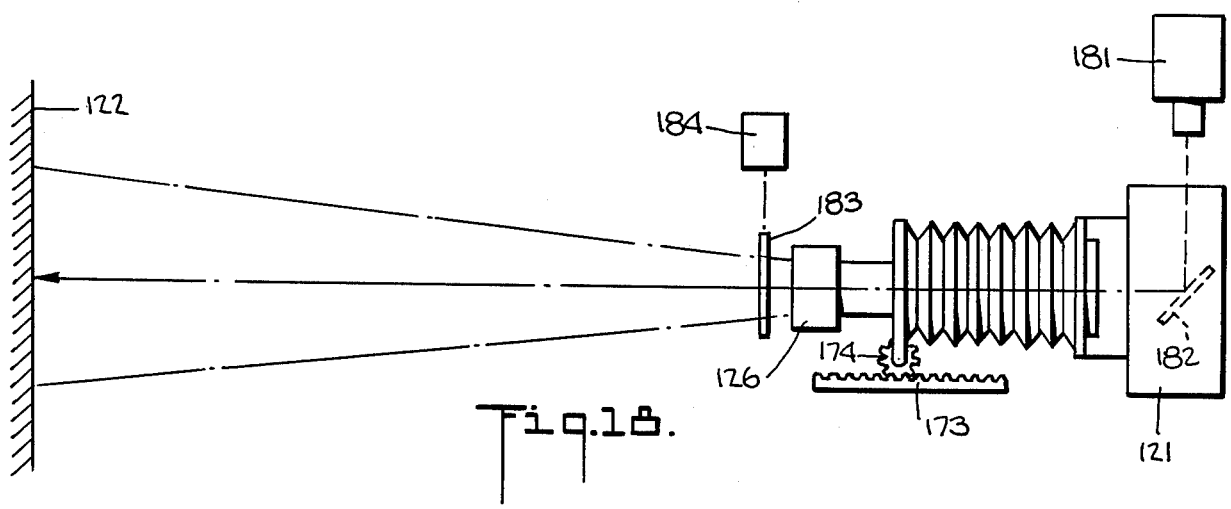
FIG. 18 illustrates another embodiment of the invention wherein an auxiliary light source is used to illuminate a reference portion of the object being imaged and the obstruction means is selectively sensitive to the light from said source.

In FIG. 18, the reference image is provided by a light polarized in a first direction and generated by a light source 181. The light from the latter source is coupled into the projection system of projector 121 via a half-silvered mirror 182. More specifically, the polarized light is coupled into the latter system such that it illuminates only a predetermined small reference portion of the object being imaged by the projector. To provide the required focus dependent movement of the reference image of the aforesaid reference portion of the object generated on the screen 122, an obstruction 183 is disposed in front of the projection lens assembly 126. In this case, the major portion of the obstruction 183 is formed from a member comprised of a filter material which permits passage of all polarizations except those polarized in the aforesaid first direction. The obstruction further includes a small aperture comprised of material which allows the passage of all polarizations including the aforesaid first polarization.

With the aforesaid construction of obstruction 183, it can be appreciated that the obstruction passes the unpolarized light illuminating the object of the projector substantially unimpaired to provide the desired image thereof on screen 122. It can be further appreciated that, with respect to the reference portion of the object illuminated by the polarized light from source 181, the obstruction acts analogously to the obstruction 124 of FIG. 9. In particular, when the obstruction is caused to reciprocate by reciprocating means 184, it appears to the aforesaid illuminated reference portion of the object as a moving aperture which scans across the projection lens forming the image thereof. As a result, during such scanning the image of the reference portion of the object will remain stationary when the projector 121 is in focus and will continuously move when the projector 121 is out of focus. The focusing condition of the projector 121 can thus be determined by suitable visual or other optical detection of the reference image on the screen 122. When an out of focus condition is detected (i.e., a moving imaged occurs) the rack 173 can be used to activate the gear 174 on the projection lens housing 126 to move the housing until no movement of the image is detected, thereby realizing an in focus condition.

Figure 19:
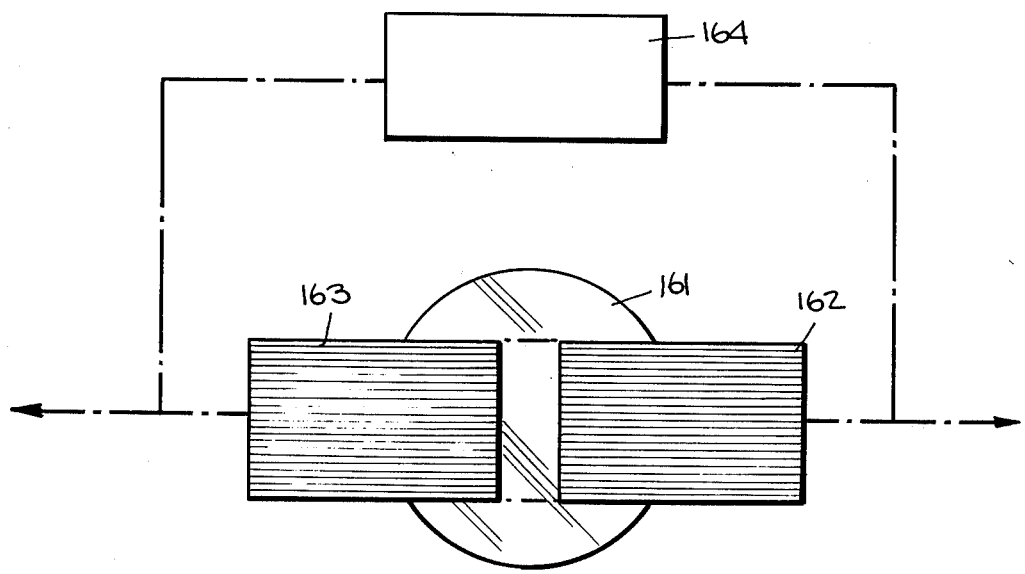
FIG. 19 shows yet another embodiment of the apparatus of the invention wherein the obstruction means is formed by two laterally spaced masks which are moved in opposite directions relative to one another.

FIG. 19 shows a further embodiment of a focusing arrangement in accordance with the principles of the present invention. In this embodiment, the focusing condition of an optical system depicted as lens 161 is again detected by movement or lack of movement of the image at the image plane of the system. More specifically, in this case, the obstruction used to provide a stationary and moving image during the in focus and out of focus conditions of the optical system, respectively, comprises two masks 162 and 163 which are arranged to obstruct diametrically opposite portions of the lens 161 and which are reciprocated by reciprocating means 164 in opposite directions.

As a result of such movement of the masks 162 and 163, the region of the lens through which light passes is contracted and expanded. This, in turn, causes the image in the image plane of the optical system to likewise expand and contract, when the system is out of focus. With this embodiment of the invention, a viewer viewing the image plane will thus see a continuously contracting and expanding image when the system is out of focus and, as before, a stationary image when the system is in focus.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for enabling the visual perception by the eye of an observer of the focusing condition of an optical system at an image plane of an optical system when the optical system is forming an image at the image plane of the optical system from light from an object disposed at an object plane of the optical system, the apparatus comprising:

a movable mask of material capable of preventing the transmission of light with respect to any portion of the light within its periphery, the mask being adapted to alternately obstruct different portions of the light from the object to produce at least first and second images of the object from the portions of the light from the object which are not obstructed, each of the portions of the light being obstructed being a major portion of all of the light from the object, the first and second images of the object being produced at a predetermined plane extending substantially parallel to the image plane of the optical system, each of the first and second images resulting from light from the object passing adjacent a different opposite side of the mask in the direction of the movement of the mask, when the mask is alternately in at least first and second positions disposed along a predetermined line extending transversely to the optical axis of the optical system, the first and second images being substantially coincident when the optical system is in focus and being displaced with respect to one another substantially in the direction of the predetermined line when the optical system is out-of-focus, said mask provides a continuum of images of said object at said predetermined plane when moved through a continuum of states between said first and second positions, said continuum of images being coincident when said optical system is in focus and displaced when said optical system is out-of-focus;

means for moving said movable mask linearly in substantially the direction of the predetermined line and alternately between the first and second positions at a predetermined frequency determined by the persistence of vision of the human eye, sufficient to create an apparent moving image when the optical system is out-of-focus, said means for alternately moving said mask from said first position to said second position going through said continuum of positions, whereby a continuously moving image is provided when said optical system is out-of-focus; and means for presenting said apparent moving image as a visual image to the eye of the observer to thereby enable the visual perception of said apparent moving image.

2. Apparatus in accordance with claim 1 and further including means for changing the focus of the optical system.

3. Apparatus in accordance with claim 1 in which said means for alternately moving said mask between first and second positions oscillates at a predetermined rate.

4. Apparatus in accordance with claim 3 in which said rate is in the range extending about 10 cycles per second.

5. Apparatus in accordance with claim 1 further including: means responsive to light falling on said predetermined plane for developing a signal indicative of the focus condition of the optical system.

6. Apparatus in accordance with claim 5 further including: means responsive to the signal indicative of the focus condition for changing the focus of the optical system.

7. Apparatus in accordance with claim 5 in which said means responsive to light includes:

first and second arrays of light sensors positioned to receive light falling on respective oppositely disposed portions of said predetermined plane, the output of each array having a different phase relationship to the means for alternately moving the mask for each of the different out of focus conditions with respect to the in focus condition; and signal processing means responsive to the output from said first and second arrays for generating a signal indicative of the condition in which the optical system is out of focus.

8. Apparatus in accordance with claim 7 further including:

synchronizing means responsive to the means for alternately moving the mask for applying a synchronizing signal to said signal processing means, the synchronizing signal defining said phase relationship.

9. Apparatus in accordance with claim 8 in which said signal processing means includes:

means for generating a difference signal corresponding to the difference between the signals from said first and second arrays; and means responsive to said synchronizing signal for sampling said difference signal.

10. Apparatus in accordance with claim 9 in which said synchronizing signal synchronizes said sampling means to sample said difference signal when said first means is in said first state.

11. Apparatus in accordance with claim 1 in which said optical system forms an optical path and in which said mask includes:

first and second laterally spaced masks positioned to intercept opposing lateral portions of the optical path.

12. Apparatus in accordance with claim 1 and further comprising a camera system having the optical system, the optical system of the camera system including a lens system having an optical path for forming the image on the image plane thereof, and in which the movable mask in the first position causes obstruction of all but a first segment of the optical path and in the second position causes obstruction of all but a second segment of the optical path.

13. Apparatus in accordance with claim 12 in which said second segment is diametrically opposite said first segment.

14. Apparatus in accordance with claim 12 and further comprising:

means for directing the optical path toward the predetermined plane.

15. Apparatus in accordance with claim 12 in which said camera system is a fundus camera.

16. Apparatus in accordance with claim 12 in which the lens system includes a lens having first and second lens segments corresponding to the first and second segments of the optical path, the mask being positioned adjacent the lens and being of sufficient dimension to obstruct all but said first lens segment when in the first position and to obstruct all but said second lens segment when in the second position.

17. Apparatus in accordance with claim 12 in which the means for alternately moving the mask includes:
   means for reciprocating the mask.

18. Apparatus for detecting the focusing condition of an optical system when the optical system is forming an image at an image plane of the optical system from light from an object disposed at an object plane of the optical system, the apparatus comprising:
   an optical system;
   a rotatable mask having an aperture adjacent to the periphery of said rotatable mask,
   a fixed mask disposed adjacent the movable mask and having a slit therein extending in a predetermined direction, and
   means for rotating said mask at a predetermined frequency, whereby the first and second images are alternately produced to provide an apparent moving image at the predetermined plane moving in correspondence to the predetermined frequency when the optical system is out-of-focus and an apparent stationary image at the predetermined plane when the optical system is in-focus, the aperture of the rotatable mask can be sequentially aligned with diametrically opposed portions of the slit in said fixed mask for sequentially producing a first and second image of the object at the image plane of the optical system, said first and second images being symmetrically disposed on opposite sides of the centerline of the optical system wheq the optical system is out-of-focus being substantially coincident when the optical system is in focus.

19. A method of detecting the focusing condition of an optical system when the optical system is forming an image at an image plane of the optical system from light from an object disposed at an object plane of the optical system by use of a movable mask of material capable of preventing the transmission of light with respect to any portion of the light within its periphery, the method comprising the steps of
   (a) placing the mask within the optical system;
   (b) moving the mask through a continuum of positions at a predetermined frequency along a predetermined line to alternately obstruct different portions of the light from the object to produce at least first and second images of the object from the portions of the light from the object which are not obstructed, each of the portions of the light being obstructed being a major portion of all of the light from the object, the first and second images of the object being produced at a predetermined plane extending substantially parallel to the image plane of the optical system, each of the first and second images resulting from light from the object passing adjacent a different opposite side of the mask in the direction of the movement of the mask when the mask is moved alternately in at least first and second positions disposed along the predetermined line extending transversely to the optical axis of the optical system, the first and second images being substantially coincident when the optical system is in focus and being displaced with respect to one another substantially in the direction of the predetermined line when the optical system is out-of-focus to create an apparent moving image which moves in correspondence to the predetermined frequency of the mask;
   (c) providing a continuum of images of said object at a predetermined plane when said mask is moved through a continuum of states between said first and second positions, said continuum of images being coincident when said optical system is in focus and displaced when said optical system is out of focus;
   (d) visually perceiving movement of said apparent moving image; and
   (e) changing the position of the optical system until the apparent stationary image is obtained.

20. A method in accordance with claim 19 further including the step of:
   changing the focus of said optical system until the detected images form said stationary image.

21. A method in accordance with claim 19 in which the step of detecting includes the step of:
   forming an electrical signal from the light impinging on said plane, said electrical signal having characteristics which are indicative of the direction by which said optical system is out of focus.

22. A method in accordance with claim 19 in which:
   said optical system is included in a system which includes a lens system for developing an optical path for forming the image on said image plane and in which;
   said step of moving the mask to produce said first and second images includes the step of obstructing preselected portions of said path.

23. Apparatus for enabling the visual perception by an eye of a user of the focusing condition of an optical system of a projection system when the optical system is forming an image at an image plane of the optical system from light from an object disposed at an object plane of the optical system, the apparatus comprising:
   a projection system having an optical system, said optical system is in the same focus condition as said projection system and is subject to changes in its focus condition commensurate with changes in the focus condition of said projection system, said projection system includes a movable assembly for positioning its projection lens, and said optical system is affixed to said movable assembly for movement therewith;
   a movable mask disposed between the projection system and the image plane and being adapted to alternately obstruct different portions of the light from the object to produce at least first and second images of the object from the portions of the light from the object which are not obstructed, the first and second images of the object being produced at a predetermined plane extending substantially parallel to the image plane of the optical system, when the mask is alternately in at least first and second positions disposed transversely with respect to the optical axis of the optical system along a predetermined line, the first and second images being substantially coincident when the optical system is in focus and being displaced with respect to one another substantially in the direction of the predetermined line when the optical system is out-of-focus; and
   means for moving said movable mask alternately between the first and second positions at a predetermined frequency sufficient to create an apparent moving image when the optical system is out-of-focus.

24. A method of detecting the focusing condition of an optical system included in a system which includes a lens system for developing an optical path for forming the image on said image plane when the optical system is forming an image at an image plane of the optical system from light from an object disposed at an object plane of the optical system by use of a movable mask of material capable of preventing the transmission of light with respect to any portion of the light within its periphery, the method comprising the steps of:
(a) placing the mask within the optical system;
(b) moving the mask at a predetermined frequency along a predetermined line to alternately obstruct different portions of the light from the object to produce at least first and second images of the object from the portions of the light from the object which are not obstructed, each of the portions of the light being obstructed being a major portion of all of the light from the object, the first and second images of the object being produced at a predetermined plane extending substantially parallel to the image plane of the optical system, each of the first and second images resulting from light from the object passing adjacent a different opposite side of the mask in the direction of the movement of the mask when the mask is moved alternately in at least first and second positions disposed along the predetermined line extending transversely to the optical axis of the optical system, the first and second images being substantially coincident when the optical system is in focus and being displaced with respect to one another substantially in the direction of the predetermined line when the optical system is out-of-focus to create an apparent moving image which moves in correspondence to the predetermined frequency of the mask;
(c) obstructing diametrically opposite segments of said path;
(d) visually perceiving movement of said apparent moving image; and
(e) changing the position of the optical system until the apparent stationary image is obtained.

25. A method in accordance with claim 24 in which: the step of obstructing preselected portions of said path includes the step of obstructing adjacent segments of said path in a progressive manner, each different segment comprising all but a different small portion of said path.

26. A method of detecting the focusing condition of an optical system when the optical system is forming an image at an image plane of the optical system from light from an object disposed at an object plane of the optical system, the method comprising the steps of:
(a) placing a rotatable mask having an aperature therein in the optical system;
(b) placing a fixed mask adjacent the movable mask, the fixed mask having a slit therein extending in a predetermined direction;
(c) rotating the mask at a predetermined frequency to cause the aperture of the mask to alternately transmit different portions of the slit extending along the length thereof to produce at least first and second images of the object from the portions of the light from the object which are so transmitted, the first and second images of the object being produced at a predetermined plane extending substantially parallel to the image plane of the optical system, each of the first or second images resulting from light transmitted by the aperature of the mask and the slit when the aperature is alternately in alignment with oppositely disposed portions of the slit, the first and second images being substantially coincident when the optical system is in focus and being displaced with respect to one another substantially in the direction of the predetermined line when the optical system is out-of-focus, whereby the first and second images are alternately produced to provide an apparent moving image at the predetermined plane when the optical system is out-of-focus and an apparent stationary image at the predetermined plane when the optical system is in focus, the apparent moving image moving in correspondence to the predetermined frequency of the mask;
(d) detecting movement of the apparent moving image; and
(e) displacing the optical system until no movement is detected.

27. A method of detecting the focusing condition of an optical system included in a system which includes a lens system for developing an optical path for forming the image on said image plane when the optical system is forming an image at an image plane of the optical system from light from an object disposed at an object plane of the optical system by use of a movable mask of material capable of preventing the transmission of light with respect to any portion of the light within its periphery, the method comprising steps of:
(a) placing the mask within the optical system;
(b) moving the mask at a predetermined frequency along a predetermined line to alternately obstruct different portions of the light from the object to produce at least first and second images of the object from the portions of the light from the object which are not obstructed, each of the portions of the light being obstructed being a major portion of all of the light from the object, the first and second images of the object being produced at a predetermined plane extending substantially parallel to the image plane of the optical system, each of the first and second images resulting from light from the object passing adjacent a different opposite side of the mask in the direction of the movement of the mask when the mask is moved alternately in at least first and second positions disposed along the predetermined line extending transversely to the optical axis of the optical system, the first and second images being substantially coincident when the optical system is in focus and being displaced with respect to one another substantially in the direction of the predetermined line when the optical system is out-of-focus to create an apparent moving image which moves in correspondence to the predetermined frequency of the mask;
(c) simultaneously obstructing diametrically opposite portions of said path;
(d) simultaneously changing in the same sense the extent of the diametrically opposite portions of said path being obstructed;
(e) visually perceiving movement of said apparent moving image; and
(f) changing the position of the optical system until the apparent stationary image is obtained.

28. Apparatus for enabling the visual perception by the eye of an observer of the focusing condition of an optical system at an image plane of an optical system when the optical system is forming an image at the image plane of the optical system from light from an object disposed at an object plane of the optical system, the apparatus comprising:

a movable mask of material capable of preventing the transmission of light with respect to any portion of the light within its periphery, the mask being adapted to alternately obstruct different portions of the light from the object to produce at least first and second images of the object from the portions of the light from the object which are not obstructed, each of the portions of the light being obstructed being a major portion of all of the light from the object, the first and second images of the object being produced at a predetermined plane extending substantially parallel to the image plane of the optical system, each of the first and second images resulting from light from the object passing adjacent a different opposite side of the mask in the direction of the movement of the mask, when the mask is alternately in at least first and second positions disposed along a predetermined line extending transversely to the optical axis of the optical system, the first and second images being substantially coincident when the optical system is in focus and being displaced with respect to one another substantially in the direction of the predetermined line when the optical system is out-of-focus;

means for moving said movable mask linearly in substantially the direction of the predetermined line and alternately between the first and second positions at a predetermined frequency determined by the persistence of vision of the human eye, sufficient to create an apparent moving image when the optical system is out-of-focus;

means for presenting said apparent moving image as a visual image to the eye of the observer to thereby enable the visual perception of said apparent moving image; and means for projecting a reference optical signal into said object plane, whereby said first and second images include said reference signal.

29. Apparatus for enabling the visual perception by the eye of an observer of the focusing condition of an optical system at an image plane of an optical system when the optical system is forming an image at the image plane of the optical system from light from an object disposed at an object plane of the optical system, the apparatus comprising:

a movable mask of material capable of preventing the transmission of light with respect to any portion of the light within its periphery, the mask being adapted to alternately obstruct different portions of the light from the object to produce at least first and second images of the object from the portions of the light from the object which are not obstructed, each of the portions of the light being obstructed being a major portion of all of the light from the object, the first and second images of the object being produced at a predetermined plane extending substantially parallel to the image plane of the optical system, each of the first and second images resulting from light from the object passing adjacent a different opposite side of the mask in the direction of the movement of the mask, when the mask is alternately in at least first and second positions disposed along a predetermined line extending transversely to the optical axis of the optical system, the first and second images being substantially coincident when the optical system is in focus and being displaced with respect to one another substantially in the direction of the predetermined line when the optical system is out-of-focus, said mask including first and second laterally spaced masks positioned to intercept opposing lateral portions of the optical path;

means for moving said movable mask linearly in substantially the direction of the predetermined line and alternately between the first and second positions at a predetermined frequency determined by the persistence of vision of the human eye, sufficient to create an apparent moving image when the optical system is out-of-focus, said means for moving said movable mask including means for alternately moving the masks in opposite directions relative to one another; and means for presenting said apparent moving image as a visual image to the eye of the observer to thereby enable the visual perception of said apparent moving image.

30. Apparatus for enabling the visual perception by the eye of an observer of the focusing condition of an optical system at an image plane of an optical system when the optical system is forming an image at the image plane of the optical system from light from an object disposed at an object plane of the optical system, the apparatus comprising:

a camera system having the optical system, the optical system of the camera system including a lens system having an optical path for forming the image on the image plane thereof;

a movable mask of material capable of preventing the transmission of light with respect to any portion of the light within its periphery, the mask being adapted to alternately obstruct different portions of the light from the object to produce at least first and second images of the object from the portions of the light from the object which are not obstructed, each of the portions of the light being obstructed being a major portion of all of the light from the object, the first and second images of the object being produced at a predetermined plane extending substantially parallel to the image plane of the optical system, each of the first and second images resulting from light from the object passing adjacent a different opposite side of the mask in the direction of the movement of the mask, when the mask is alternately in at least first and second positions disposed along a predetermined line extending transversely to the optical axis of the optical system, the first and second images being substantially coincident when the optical system is in focus and being displaced with respect to one another substantially in the direction of the predetermined line when the optical system is out-of-focus and in which the movable mask in the first position causes obstruction of all but a first segment of the optical path and in the second position causes obstruction of all but a second segment of the optical path, said movable mask including a first polarizing means for polarizing light in said first segment of the optical path in a first polarization direction, a second polarizing means for polarizing light in said second segment of the optical path in a second polarization direction, and polarization analyzer means for intercepting said first and second polarized segments and having a first portion for transmitting light from said first polarization and a second portion for transmitting light from said second polarization, said analyzer means when in said first position having said first portion aligned with said second segment and when in said second position having said second portion aligned with said first segment;

means for moving said movable mask linearly in substantially the direction of the predetermined line and alternately between the first and second positions at a predetermined frequency determined by the persistence of vision of the human eye, sufficient to create an apparent moving image when the optical system is out-of-focus, including means for reciprocating the analyzer means from the first to the second position; and means for presenting said apparent moving image as a visual image to the eye of the observer to thereby enable the visual perception of said apparent moving image.

31. Apparatus in accordance with claim 30 in which the means for alternately moving said mask includes:

means for reciprocating the analyzer means from the first to the second position.

32. Apparatus for enabling the visual perception by an eye of a user of the focusing condition of an optical system of a projection system when the optical system is forming an image at an image plane of the optical system from light from an object disposed at an object plane of the optical system, the apparatus comprising:

a projection system having an optical system, a movable mask disposed between the projection system and the image plane and being adapted to alternately obstruct different portions of the light from the object to produce at least first and second images of the object from the portions of the light from the object which are not obstructed, the first and second images of the object being produced at a predetermined plane extending substantially parallel to the image plane of the optical system, when the mask is alternately in at least first and second positions disposed transversely with respect to the optical axis of the optical system along a predetermined line, the first and second images being substantially coincident when the optical system is in focus and being displaced with respect to one another substantially in the direction of the predetermined line when the optical system is out-of-focus, said mask provides a continuum of images of said object at said predetermined plane when moved through a continuum of states between said first and second positions, said continuum of images being coincident when said optical system is in focus and displaced when said optical system is out-of-focus; and means for moving said movable mask alternately between the first and second positions at a predetermined frequency sufficient to create an apparent moving image when the optical system is out-of-focus said means for alternately moving said mask from said first position to said second position going through said continuum of positions, whereby a continuously moving image is provided when said optical system is out-of-focus.

33. Apparatus in accordance with claim 30 in which said projection system includes a projection lens and in which:

said mask has an aperture therein, said mask being arranged to obstruct all but the portion of said lens defined by said aperture and having a continuum of positions between said first and second positions corresponding to a continuum of locations of said aperture across the diameter of said lens; and said means for alternately moving said mask comprising means for alternately moving said mask between said first and second positions through said continuum of positions, whereby said aperture is moved across the diameter of said lens to provide a continuously moving image when said optical system is out-of-focus.

34. Apparatus in accordance with claim 33 in which:

the size of said aperture forms a discernible image of the edges of said aperture in said predetermined plane.

35. Apparatus in accordance with claim 34 further including:

means for moving said projection lens toward said object plane in response to the detected directions of movement of imaged edges and said image of said object being the same and for moving said projection lens away from said object plane in response to the detected directions of movement of said imaged edges and said image of said object being opposite one another.

36. Apparatus in accordance with claim 32 in which:

said masking means includes a mask having optical characteristics over a first larger portion of its area which differ from the optical characteristics over a second smaller portion of its area.

37. Apparatus in accordance with claim 32 in which:

said optical system is in the same focus condition as said projection system and is subject to changes in its focus condition commensurate with changes in the focus condition of said projection system.

38. Apparatus for enabling the visual perception by an eye of a user of the focusing condition of an optical system of a projection system when the optical system is forming an image at an image plane of the optical system from light from an object disposed at an object plane of the optical system, the apparatus comprising:

a projection system having an optical system and a projection lens;

movable masking means disposed between the projection system and the image plane and being adapted to alternately obstruct different portions of the light from the object to produce at least first and second images of the object from the portions of the light from the object which are not obstructed, the first and second images of the object being produced at a predetermined plane extending substantially parallel to the image plane of the optical system, when the mask is alternately in at least first and second positions disposed transversely with respect to the optical axis of the optical system along a predetermined line, the first and second images being substantially coincident when the optical system is in focus and being displaced with respect to one another substantially in the direction of the predetermined line when the optical system is out-of-focus, including a first fixed mask portion disposed adjacent said lens and having a slit therein extending across the diameter of said lens and a second rotatable mask portion arranged adjacent said first mask portion and having first and second pluralities of apertures arranged along symmetrical arcuate paths; and means for moving said movable mask alternately between the first and second positions at a predetermined frequency sufficient to create an apparent moving image when the optical system is out-of-focus including means for rotating said second mask portion; whereby the apertures of said first and second pluralities successively pass said slit so as to provide an effective aperture which moves progressively across the length of said slit extending along the diameter of said lens.

39. Apparatus in accordance with claim 38 in which:

said second mask portion is substantially circular in shape;

said arcuate path along which said first plurality of apertures are arranged is defined by the intersections of a plurality of concentric circles with a first plurality of radial lines spaced with respect to one another; and said arcuate path along which said second plurality of apertures are arranged is defined by the intersections of said plurality of concentric circles with a second plurality of radial lines spaced with respect to one another and beginning with the last radial line of said first plurality.

40. Apparatus for enabling the visual perception by an eye of a user of the focusing condition of an optical system of a projection system when the optical system is forming an image at an image plane of the optical system from light from an object disposed at an object plane of the optical system, the apparatus comprising:

a projection system having an optical system, movable masking means disposed between the projection system and the image plane and being adapted to alternately obstruct different portions of the light from the object to produce at least first and second images of the object from the portions of the light from the object which are not obstructed, the first and second images of the object being produced at a predetermined plane extending substantially parallel to the image plane of the optical system, when the mask is alternately in at least first and second positions disposed transversely with respect to the optical axis of the optical system along a predetermined line, the first and second images being substantially coincident when the optical system is in focus and being displaced with respect to one another substantially in the direction of the predetermined line when the optical system is out-of-focus, said masking means including a mask having optical characteristics over a first larger portion of its area which differ from the optical characteristics over a second smaller portion of its area, said first portion of said masking means comprising means for allowing passage of light polarized in all but a first direction and said second portion of the area of said masking means comprising means for allowing passage of light polarized in all directions; and means for moving said movable mask alternately between the first and second positions at a predetermined frequency sufficient to create an apparent moving image when the optical system is out-of-focus.

41. Apparatus in accordance with claim 40 in which the projection system includes a projection lens and in which:

said mask is arranged adjacent said projection lens.

42. Apparatus in accordance with claim 40 further including:

means for illuminating a small portion of said object with light having said first polarization direction comprising a light source for generating light of said first polarization, and a mirror for receiving said generated light and directing it to said object.

* * * * *

UNITED STATES PATENT AND TRADEMARK OFFICE
CERTIFICATE OF CORRECTION

PATENT NO. : 4,201,456
DATED : May 6, 1980
INVENTOR(S) : Myron L. Wolbarsht

It is certified that error appears in the above-identified patent and that said Letters Patent are hereby corrected as shown below:

Column 3, line 44, delete "inventor" and insert --invention--

Column 7, line 41, delete "Fig." and insert --Figs.--

Column 7, line 50, delete "it" and insert --It--

Column 10, line 56, delete "wil" and insert --will--

Column 15, line 40, delete "continnum" and insert --continuum--

Column 17, line 32, delete "wheg" and insert --when--

Column 17, line 43, after "of" insert --:--

Column 24, line 1, delete "claim 30" and insert --claim 32--

Signed and Sealed this

Second Day of December 1980

[SEAL]

Attest:

SIDNEY A. DIAMOND

Attesting Officer    Commissioner of Patents and Trademarks